C. W. WHITE,

Assignor of part interest to G. P. LORING & D. W. B. JACKSON.

Eyelets for Securing Buckles to Straps.

No. 8,484. Reissued Nov. 12, 1878.

Witnesses.

Thomas F. Currier

A. B. Davis

Inventor,

Chas. W. White, by

Chas. F. Sleeper, his atty.

N. PETERS, PHOTO-LITHOGRAPHER, WASHINGTON, D. C.

UNITED STATES PATENT OFFICE.

CHARLES W. WHITE, OF BOSTON, MASSACHUSETTS, ASSIGNOR OF PART INTEREST TO GAYTON P. LORING AND DENNISON W. B. JACKSON.

IMPROVEMENT IN EYELETS FOR SECURING BUCKLES TO STRAPS.

Specification forming part of Letters Patent No. 206,055, dated July 16, 1878; Reissue No. 8,484, dated November 12, 1878; application filed November 1, 1878.

*To all whom it may concern:*

Be it known that I, CHARLES W. WHITE, of Boston, county of Suffolk, in the State of Massachusetts, have invented a new and useful Improvement in Buckles, which improvement is fully set forth in the following specification and accompanying drawings.

My invention consists in a buckle with an eyelet secured to the attaching-plate of the buckle in such a manner that the buckle may be freely handled without displacing the eyelet, thus making a complete buckle having an eyelet upon its plate ready for use in eyeleting the attaching-plate to the standing strap.

Figure 1:
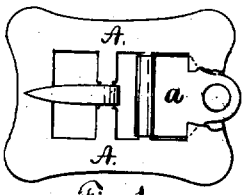
Figure 2:
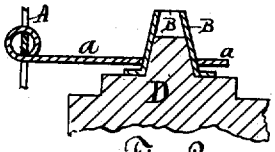
Figure 3:
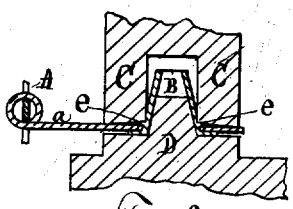

The best method known to me to embody my invention is shown in the drawings, and the form of buckle which I at present use is shown in Figure 1, where a plate, *a*, is hinged to a bar crossing from one side to the other of the frame A, said plate depending beneath the buckle. This plate is perforated at the proper place for its attachment to the strap, and in this perforation I place a frusto-conical eyelet, B, which I secure firmly to the plate in the following manner, viz: I place the eyelet upon a holder, D, of the shape of the inside of the eyelet, and then place the plate over the eyelet, as shown in Fig. 2, the aperture in the plate being made slightly smaller than the base of the conical portion of the eyelet. When in this position I bring down upon the eyelet the inner edges of the cylindrical head C, as shown in Fig. 3, which scrape a small portion of metal from the sides of the eyelet and force it down upon the plate, which, in its turn, is forced down by the head to and in contact with the head of the eyelet. The portion of metal thus scraped from the cone is, at the end of the operation, a flange, *e*, from the cone, serving, with the head of the eyelet, to secure the eyelet firmly to the plate without a chance of its being loosened or deranged by handling.

The buckle being thus prepared, its attachment to the strap is obvious, consisting merely in punching the strap, inserting the eyelet, and upsetting it with the ordinary tool. The eyelet which I prefer for this purpose is one that will divide into portions or prongs, as shown, each of which has a separate clinch upon the leather.

Figure 4:
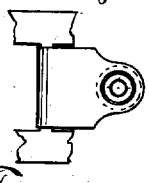
Figure 5:
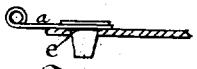
Figure 6:
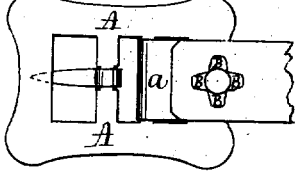

In the drawings, Fig. 1 represents a buckle with the plate perforated for the insertion of the eyelet. Fig. 2 shows the eyelet and plate in position upon the holder. Figs. 3 and 4 show the eyelet secured to the plate. Fig. 5 shows the eyelet passed through the strap, and Fig. 6 shows the eyelet clinched to the strap.

I am aware that eyelets have been used heretofore for eyeleting the attaching-plate of a buckle to the standing-strap; but, so far as I know, I am the first to fasten the eyelet to the attaching-plate so that it will not be displaced.

Having thus described my invention, what I claim as new, and desire to secure by Letters Patent, is—

A buckle having an eyelet firmly secured to the attaching-plate, ready for use in eyeleting the attaching-plate to the standing strap.

CHAS. W. WHITE.

Witnesses:

CHAS. F. SLEEPER,
ELLA F. HALL.